United States Patent [19]

Ishikawa et al.

[11] 3,853,098

[45] Dec. 10, 1974

[54] DRIVING SYSTEM FOR AUTOMOBILE ENGINE COOLING FAN

[75] Inventors: Toshio Ishikawa, Kariya; Mituzi Ohshima, Oobu, both of Japan

[73] Assignee: Nippondenso Co., Ltd., Kariya-shi, Aichi-ken, Japan

[22] Filed: Sept. 21, 1973

[21] Appl. No.: 399,497

[30] Foreign Application Priority Data
Oct. 5, 1972  Japan.............................. 47-100479
Nov. 1, 1972  Japan.............................. 47-109725

[52] U.S. Cl.......... 123/41.11, 123/41.12, 123/41.49
[51] Int. Cl............................................. F01p 7/02
[58] Field of Search........... 123/41.12, 41.11, 41.48, 123/41.49, 41.06, 41.44, 41.46, 41.47, 41.63, 41.01

[56] References Cited
UNITED STATES PATENTS

| | | | |
|---|---|---|---|
| 1,373,848 | 4/1921 | Waite............................... | 123/41.12 |
| 1,481,307 | 1/1924 | Stuart.............................. | 123/41.12 |
| 1,662,723 | 3/1928 | Snow .............................. | 123/41.12 |
| 1,900,586 | 3/1933 | Rippe.............................. | 123/41.12 |
| 1,934,783 | 11/1933 | Arterburn......................... | 123/41.12 |
| 2,396,000 | 3/1946 | Findley ............................ | 123/41.12 |
| 2,452,264 | 10/1948 | Russell............................. | 123/41.12 |
| 3,120,219 | 2/1964 | Nallinger ......................... | 123/41.12 |
| 3,394,682 | 7/1968 | Bensinger ........................ | 123/41.12 |

FOREIGN PATENTS OR APPLICATIONS
924,950  3/1947  France............................ 123/41.11

Primary Examiner—Manuel A. Antonakas
Assistant Examiner—Daniel J. O'Connor
Attorney, Agent, or Firm—Cushman, Darby & Cushman

[57] ABSTRACT

In an automobile engine cooling system of the type in which the engine cooling water is circulated in a radiator and a cooling fan provided to supply a draft of cooling air through the radiator is driven by the engine, a cooling fan driving system comprising an one-way clutch provided between the cooling fan and the engine to transmit the power in one direction but not the other, i.e., from the engine side to the cooling fan side, a motor for driving the cooling fan at a higher speed with the increased number of revolutions than that of the engine at the idling speed, and motor control means for automatically switching on the motor when the engine temperature exceeds a preset temperature or when the automobile is idling or moving at slow speeds.

8 Claims, 11 Drawing Figures

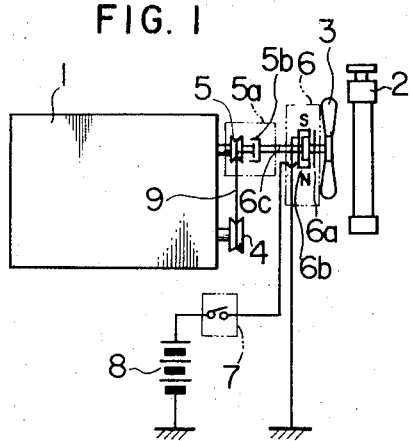
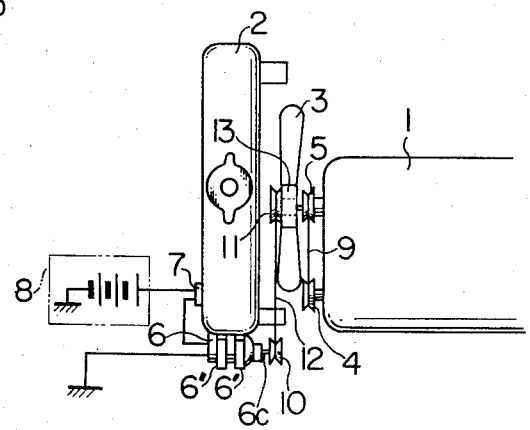
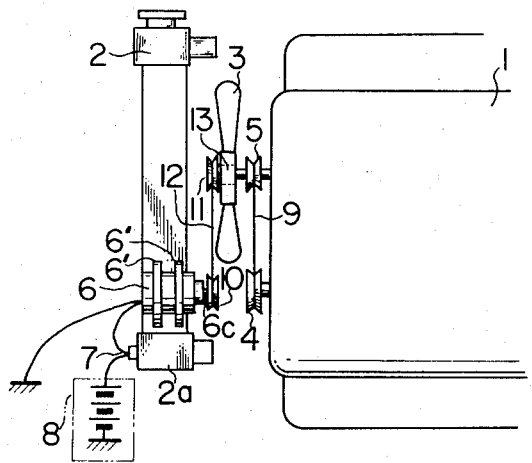

DRIVING SYSTEM FOR AUTOMOBILE ENGINE COOLING FAN

BACKGROUND OF THE INVENTION

1. FIELD OF THE INVENTION

The present invention relates to a driving system for automobile engine cooling fans.

2. DESCRIPTION OF THE PRIOR ART

Cooling fan driving systems known in the art are divided into the following two general classes:
1. Engine-driven type cooling fans deriving the required power from the crankshaft pulley of the engine.
2. Motor-driven type cooling fans utilizing an electric motor as a driving source.

The cooling fans of these two classes have their own advantages and disadvantages which are mutually contradictory. For example, in the case of the engine-driven type cooling fans, when the vehicle is at idle or during the traffic jam, the number of revolutions of the engine is low and hence the number of revolutions of the cooling fan is also low. Thus, the engine tends to overheat due to the lack of capacity of the cooling fan to supply the required air. Particularly, this tendency is marked in an automobile equipped with an air conditioner and exhaust gas purifier. To overcome these drawbacks, an attempt has been made to increase the size of the cooling fan and equip it with a shroud to increase the cooling efficiency of the fan. The disadvantages of this attempt are the generation of noise, the increased loss of the engine horse power, etc. In the other hand, in the case of the electric-motor driven type cooling fans, the cooling fan operates at a constant speed with a predetermined number of the revolutions independently of the driving conditions of an automobile. Consequently, if the number of revolutions of the cooling fan is preset to suit the cooling requirements for the driving conditions during idling and traffic jam, the cooling capacity tends to be insufficient when the vehicle is climbing a hill or moving at a high speed and therefore the engine cooling system fails to perform its function properly. In the other hand, if the number of revolutions of the cooling fan is present on the basis of the cooling requirements when the vehicle is climbing a hill or running at a high speed, a fan driving motor having a very large capacity must be used and therefore this cooling fan tends to become unfit for use on many kinds of automobiles.

SUMMARY OF THE INVENTION

With a view to overcoming the foregoing difficulty, it is an object of the present invention to provide a new and improved cooling fan driving system which combines in one system the advantages of the above-described two classes of the cooling fan driving systems and which is adapted so that when the cooling capacity of an engine-driven cooling fan is found to be insufficient, the cooling fan is operated at a higher speed by a motor.

The present invention thus comprises a cooling fan driving system in which an one-way clutch connects the driving shaft of a cooling fan to a shaft deriving a power from a crankshaft pulley, and a motor is provided as a driving source for the cooling fan in addition to the engine, whereby the cooling fan is normally operated as an engine-driven fan, and when there is the lack of cooling capacity of the cooling fan, motor control means, such as, an engine cooling temperature sensing thermostat switch is actuated to energize the motor and thereby to rotate the cooling fan at a higher speed.

The system according to this invention has among its great advantages the fact that during the idling of an automobile, the radiator cooling fan is operated at a higher speed by the operation of the motor to greatly increase the radiator cooling capacity of the fan and thereby to prevent the automobile engine from overheating. Particulary, the present invention is very useful, if it is applied to an automobile equipped with an air conditioner and an exhaust gas purifier. Moreover, there is another great advantage in that since the motor may be designed taking into consideration only the cooling capacity of the fan during the idling, a small capacity motor may be used which imposes no burden on the power supply unit of the vehicle. There is still further advantage in that the size of a cooling fan may be as small as possible provided there is no possibility of engine overheating excepting at idle. There is still another advantage in that when the motor is operated, the rotation of the motor is prevented from being transmitted to the engine by the action of the one-way clutch and therefore the operation of the engine is not interferred in any way.

BRIEF DESCRIPTION OF THE DRAWING

FIG. 1 is a schematic diagram showing the general construction of an embodiment of a cooling fan driving system according to the present invention.

FIGS. 3 and 4 show respectively a plan view and a side view of a second embodiment of the present invention.

DESCRIPTION OF THE PREFERRED EMBODIMENT

Figure 2:
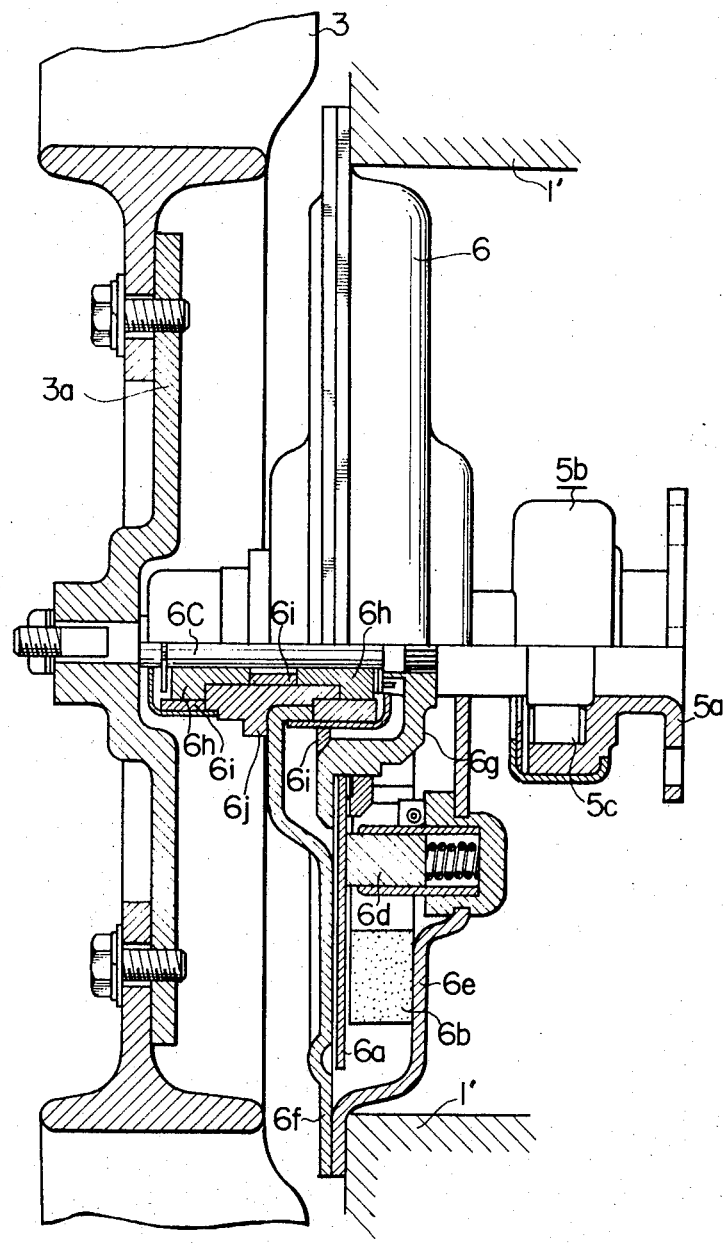
FIG. 2 is a sectional view showing the principal part of the embodiment of FIG. 1.

The present invention will now be described with reference to the illustrated embodiments.

Referring first to FIG. 1 showing a first embodiment, numeral 1 designates an automobile engine, 2 a radiator for cooling the cooling water of the engine 1, 3 a cooling fan, 4 a crankshaft pulley of the engine 1, 5a a fan pulley assembly comprising a pulley 5 and a one-way clutch 5b. Numeral 6 designates a motor comprising an armature 6a with a printed wire coil, a field ferrite magnet 6b and an armature shaft 6c which is integral with the fan drive shaft. The cooling fan 3 is mounted on one end of the armature shaft 6c whose other end is connected to the pulley 5 through the one-way clutch 5b. Numeral 7 designates a thermostat switch located in the water jacket of the engine 1 or in the tank of the radiator 2 and adapted to operate by sensing the temperature of the engine cooling water. Numeral 8 designates a battery. The thermostat switch 7 may comprise a wax-type switch utilizing the variation of volume of a wax with temperature, ferrite-type thermostat switch utilizing the Curie point of a ferrite, semi-conductor switching circuit utilizing a thermistor or the like.

FIG. 2 shows in detail the motor section of the system according to this invention. The motor 6 is of a type generally known as a printed motor which can be made very thin in construction. Numerals 6a, 6b and 6c designate respectively the previously mentioned armature, field ferrite magnet and armature shaft. Numeral 6d designates brushes, 6e and 6f housing members made of magnetic material and also adapted to form the magnetic circuit of the ferrite magnet 6b. The housing members 6e and 6f are secured to a portion 1' of the engine 1. Numeral 6g designates a supporting member for the armature 6a which is securely forced to fit on the armature shaft 6c. Numeral 6h designates sintered oiled bearings, 6i felts for supplying lubricant to the bearings 6h. Numeral 6j designates a supporting center piece for the bearings 6h which is securely caulked to the housing member 6f. The cooling fan 3 is fixedly mounted on the end of the armature shaft 6c through a mounting member 3a and the other end of the armature shaft 6c is inserted into an inside of rollers 5c of the one-way clutch 5b. The rollers 5c of the one-way clutch 5b are enclosed by an outer race 5d which is connected to the pulley 5 shown in FIG. 1. The one-way clutch 5b is of the construction which transmits the power in one direction only, i.e., from the fan pulley assembly 5a to the cooling fan 3.

With the construction described above, the operation of this embodiment is as follows. When the engine 1 is operating, the cooling fan 3 is driven by the driving power transmitted to the armature shaft 6c by way of the crankshaft pulley 4 of the engine 1, a belt 9 and the fan pulley assembly 5a and provides cooling air through the radiator 2 to cool it. Assuming here that the pulley ratio between the pulleys 4 and 5 is 1 : 1, then the cooling fan 3 is driven at the same speed as the engine rpm when the motor 6 is not in operation. Consequently, when the vehicle is at rest, i.e., when the engine is idling, the engine speed of for example 700 rpm causes the cooling fan 3 to drive at a speed of 700 rpm. If the outside air temperature is high, however, such a low speed tends to result in the lack of cooling capacity of the radiator 2 and hence the engine 1 tends to overheat. According to the present invention, the thermostat switch 7 is designed so that when the engine cooling temperature in the water jacket of the engine 1 reaches 95°C, for example, the thermostat switch 7 is closed. Consequently, if, during the idling or traffic jam, the engine cooling water temperature rises, the thermostat switch 7 is closed to energize the armature 6a of the motor 6. This causes the motor 6 to start operating automatically so that the cooling fan 3 is driven by the motor 6 at a speed higher than engine rpm. In other words, if the speed of the motor 6 is preset to for example 1500 rpm, the cooling fan 3 is driven at a higher speed of two times the idling speed (700 rpm of the engine 1 with the result that the cooling capacity of the radiator 2 is increased considerably to prevent the engine 1 from overheating. In this case, even when the motor 6 starts operating suddenly, the operation of the motor 6 disengages the one-way clutch 5b and interrupts the transmission of the rotation between the fan pulley assembly 5a and the motor 6. Consequently, the cooling fan 3 is driven by the motor 6 independently of the engine 1. Thus, the operation of the engine 1 is not hindered in any way. When the vehicle attains the normal driving conditions so that the cooling fan 3 is driven at a speed higher than that of the engine 1, the cooling capacity of the radiator 2 is increased with the result that the engine cooling water temperature drops below the preset temperature of the thermostat switch 7 and thus the thermostat switch 7 opens to stop the motor 6 automatically.

While, in the embodiment described above, the motor 6 comprises a thin printed motor thus making the cooling fan driving system compact in construction, any ordinary motor may of course be employed in place of the printed motor.

The second embodiment of this invention shown in FIGS. 3 and 4 will now be described. In this second embodiment, the armature shaft of the motor 6 is not integral with the driving shaft of the cooling fan 3 and the separately formed shafts are connected with each other through the pulleys and belt. In FIGS. 3 and 4, numeral 1 designates the engine, 2 the radiator, 3 the cooling fan, 4 the crankshaft pulley, 5 the fan pulley, 6 the motor, 6' mounting brakets for mounting the motor 6 on the side plate of the radiator 2, 7 the thermostat switch adapted to operate by sensing the temperature of the engine cooling water. In this embodiment, the thermostat switch 7 is located within a lower tank 2a of the radiator 2. Numeral 8 designates the battery, 9 the belt interconnecting the crankshaft pulley 4 and the fan pulley 5, 10 an auxiliary pulley mounted on the armature shaft 6c of the motor 6, 11 an auxiliary pulley mounted on the cooling fan 3, 12 a belt interconnecting the auxiliary pulleys 10 and 11, 13 a one-way clutch corresponding to the one-way clutch 5b of the first embodiment and mounted in the boss of the fan pulley 5. The one-way clutch 13 is constructed so that the driving power is transmitted in one direction only, i.e., from the fan pulley 5 to the cooling fan 3.

With the construction described above, the operation of the second embodiment is as follows. When the motor 6 is not in operation, the driving power is transmitted from the crankshaft pulley 4 of the engine 1 to the cooling fan 3 by way of the belt 9, the fan pulley 5 and the one-way clutch 13 and the cooling fan 3 comes into operation. On the other hand, with the engine idling, for example, when the engine cooling temperature rises up to a predetermined temperature (e.g., 95°C) so that the thermostat switch 7 closes, the motor 6 is energized and starts rotating. The rotation of the motor 6 is transmitted to the cooling fan 3 from the auxiliary pulley 10 by way of the auxiliary pulley 11. Consequently, the cooling fan 3 is driven at a higher set motor speed (e.g., 1500 rpm) to increase the cooling capacity of the radiator 2. The rotation of the motor 6 is not transmitted to the fan pulley 5 by the action of the one-way clutch 13.

The advantage of this second embodiment is that firstly the location of the motor 6 can be selected as desired and secondly the pulley ratio (reduction ratio) between the auxiliary pulleys 10 and 11 can be set as desired to operate the motor 6 with the maximum efficiency. Thirdly, the endurance of the motor 6 is improved since the vibration of the engine is not directly imparted to the motor.

Figure 5A:
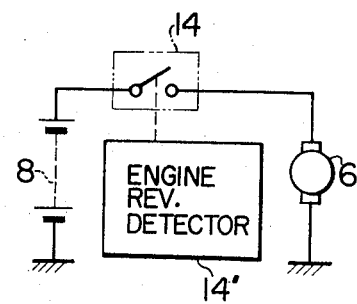
FIGS. 5a and 5b are electric wiring diagrams showing respectively a third and a fourth embodiments of the present invention.
Figure 5B:
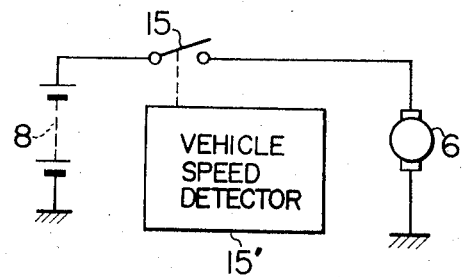

While, in the above-described first and second embodiments, the temperature of the engine cooling water is detected by the thermostat switch 7 to control the motor 6, the engine room temperature may for example be detected in place of the engine cooling water temperature. Further, as will be seen from the description of the first and second embodiments, the operation of the motor 6 is necessary only when the vehicle is idling or moving at low speeds and therefore an engine revolution responsive switch 14 shown in FIG. 5a or a vehicle speed responsive switch 15 shown in FIG. 5b may be employed in place of the thermostat switch 7 to control the motor 6. In other words, in the third embodiment shown in FIG. 5a, the number of revolutions of the engine 1 may be detected with an engine revolution detector 14' so that when the engine revolution drop below a predetermined number of revolutions, the switch 14 is closed to actuate the motor 6. Further, in the fourth embodiment shown in FIG. 5b, the vehicle speed may be detected by a vehicle speed detector 15' so that when the vehicle speed drops below a preset vehicle speed, the switch 15 is closed to actuate the motor 6. Both the engine revolution detector 14' and the vehicle speed detector 15' shown respectively in FIGS. 5a and 5b may be of the known constructions.

Figure 6:
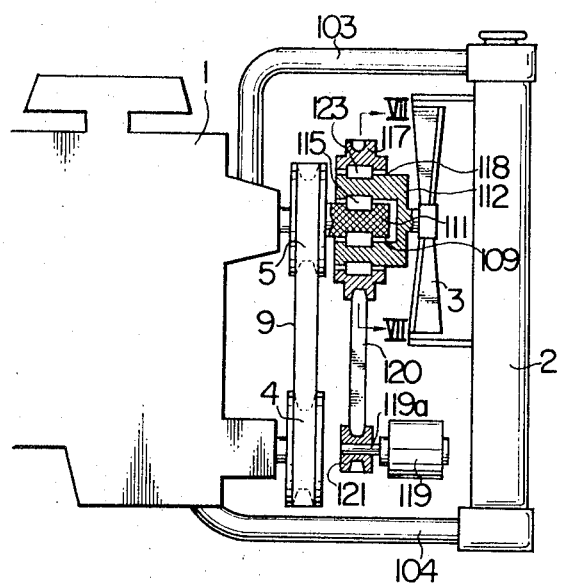
FIG. 6 is a fragmentary sectional view showing a fifth embodiment of the cooling fan driving system according to the present invention.

The fifth embodiment shown in FIG. 6 will now be described. In FIG. 6, the identical reference numerals as used in FIG. 1 designate the identical or like component parts. In FIG. 6, numerals 103 and 104 designate cooling water circulating tubes. The fan pulley 5 is secured to a driving pulley shaft 111 to be driven as a unit therewith. One end of the driving pulley 111 is connected to the water pump (not shown) in the engine 1 and the other end is connected to a rotary shaft 112 of the cooling fan 3 through a first one-way clutch 109. One end of the rotary shaft 112 of the cooling fan 3 has the latter mounted thereon and the other end is connected through a second one-way clutch 118 to a motor driving pulley 117 in such a manner as to enclose the driving pulley shaft 111. Numeral 119 designates a motor, 119a a motor shaft of the motor 119, 121 a motor pulley provided at one end of the motor 119, 120 a belt interconnecting the motor driving pulley 117 and the motor pulley 121.

Figure 7:
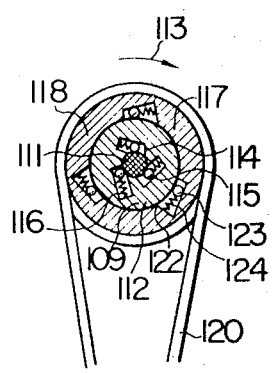
FIG. 7 is a sectional view taken along the line VII—VII of FIG. 6.

Referring now to FIG. 7, the construction of the first and second one-way clutches 109 and 118, respectively, will be described. The conctruction of the first one-way clutch 109 will be described first, in which numeral 114 designate notches formed in the inner periphery of the rotary shaft 112 of the cooling fan 3 with the depth of each notch being reduced gradually in the direction of rotation shown by an arrow 113. Numeral 115 designates rollers disposed in the notches 114, with each of the rollers 115 being normally pressed by a spring 116 into the opened section of the notch 14. The rollers 115 are placed between the inner periphery of the rotary shaft 112 of the cooling fan 3 and the outer periphery of the driving pulley shaft 111.

With the construction described above, the one-way clutch 109 operates as follows. When the driving pulley shaft 111 rotates only in the direction of the arrow 13 in FIG. 7, the rollers 115 in the notches 114 are rotated into the opened sections thereof so that the driving pulley shaft 111 is connected to the rotary shaft 112 of the cooling fan 3 to transmit the rotation of the driving pulley shaft 111 to the cooling fan shaft 112. When the cooling fan shaft 112 rotates in the direction of the arrow 113, the rollers 115 compress the springs 116 to be rotated back into unopened sections of the notches 114 and therefore the rotation of the cooling fan shaft 112 is not transmitted to the driving pulley shaft 111. In other words, the first one-way clutch 109 transmits the driving power in one direction only, i.e., from the driving pulley shaft 111 to the cooling fan shaft 112.

Next, the construction of the second one-way clutch 118 will be described with reference to FIG. 7, in which numeral 112 designates notches formed in the inner periphery of the motor driving pulley 117, with the depth of each notch 122 being increased in the direction of the rotation shown by the arrow 113. Numeral 123 designate rollers fitted into the notches 122 with each of the rollers 123 being normally pressed into the shallow section of the notch 122 by a spring 124. The rollers 123 of the second one-way clutch 118 are placed between the outer periphery of the cooling fan shaft 112 and the inner periphery of the driving pulley 117.

The second one-way clutch 118 constructed as above described operates as follows. When the motor driving pulley 117 rotates only in the direction shown by the arrow 113, the rollers 123 in the notches 122 are rolled into the shallow sections of the notches 122 so that the motor driving pulley 117 is connected to the cooling fan shaft 112 to transmit the rotation of the former to the latter. In this case, if the cooling fan shaft 112 is rotating in the direction shown by the arrow 113, the rollers 123 compress the springs 124 and are thus rolled back into the deeper sections of the notches 122. Consequently, the rotation of the cooling fan shaft 112 is not transmitted to the motor driving pulley 117. That is, the second one-way clutch 118 transmits the driving power in one direction only, i.e., from the driving pulley 117 to the cooling fan shaft 112.

Figure 8:
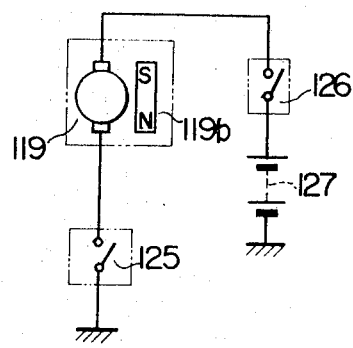
FIG. 8 is an electric wiring circuit for operating the motor used in the system of the present invention.

Referring now to FIG. 8, the electric circuit for operating the motor 119 used in the above-described fifth embodiment will be described. In FIG. 8, numeral 119 designates the motor, 119b a ferrite field magnet for the motor 119, 125 a thermostat switch which is located in the water jacket of the engine or the tank of the radiator that is not shown to come into operation by sensing the temperature of the engine cooling water, 126 an ignition switch, 127 a battery.

The operation of the fifth embodiment constructed as above described will now be explained with reference to FIGS. 6 through 8. When the engine is operating, the driving power transmitted to the rotary shaft 112 of the cooling fan 3 through the crankshaft pulley 4 of the engine 1, the belt 9, the fan pulley 5 and the first one-way clutch 109 drives the cooling fan 3 to provide a draft of cooling air through the radiator 2 and cool it. In this case, since the second one-way clutch 118 is adapted to transmit the unidirectional driving power from the motor driving pulley 117 to the rotary shaft 112 of the cooling fan 3, the rotation of the rotary shaft 112 of the cooling fan 3 does not cause the motor driving pulley 117 to rotate and consequently the motor 119 does not idle. In this case, if the pulley ratio between the pulleys 4 and 5 is selected 1 : 1, then when the motor 119 is not operating, the cooling fan 3 is driven at the same speed as the engine revolutions. As a result, when the vehicle is at rest, i.e., during idling, if the engine revolutions are for example 700 rpm, the cooling fan 3 is also driven at the same speed of 700 rpm. If, however, the outside air temperature is high, such a low speed results in the lack of cooling capacity of the radiator 2 and this in turn tends to cause the engine 1 to overheat. Then, if the thermostat switch 125 is preset so that it is closed when the engine cooling water temperature reaches for example 95°C in the water jacket of the engine 1, during idling or traffic jam, the increased temperature of the engine cooling water closes the thermostat switch 125 to energize the motor 119. This causes the motor 119 to start operating automatically and the cooling fan 3 is driven by the motor 119 at a speed higher than the engine revolutions. In this case, if the pulley ratio between the motor driving pulley 117 and the motor pulley 121 is for example preselected 1 : 2 and if the number of revolutions of the motor 119 is for example preset 3,000 rpm, the cooling fan 3 is driven at a higher speed of two times the number of revolutions of the engine 1 at idle (e.g., 700 rpm) and thus the cooling capacity of the radiator 2 is increased considerably to prevent the engine 1 from overheating. In this case, if the motor 119 starts operating suddenly, the rotation of the motor 119 disengages the first one-way clutch 109 to interrupt the transmission of power between the pulley shaft 111 of the fan pulley 5 and the rotary shaft 112 of the cooling fan 3. Consequently, the rotation of the motor 119 engages the second one-way clutch 118 which transmits the power in one direction only, i.e., from the motor driving pulley 117 to the cooling fan 3 and thus the motor 119 drives the cooling fan 3 independently of the engine 1. Thus, the operation of the engine 1 is not hindered in any way. When the vehicle reaches the normal running speed so that the cooling fan 3 is driven by the engine 1 at a higher speed, the cooling capacity of the radiator 2 is increased and thus the temperature of the engine cooling water drops below the preset temperature of the thermostat switch 125. Consequently, the thermostat switch 125 opens and the motor 119 is stopped automatically.

Figure 9:
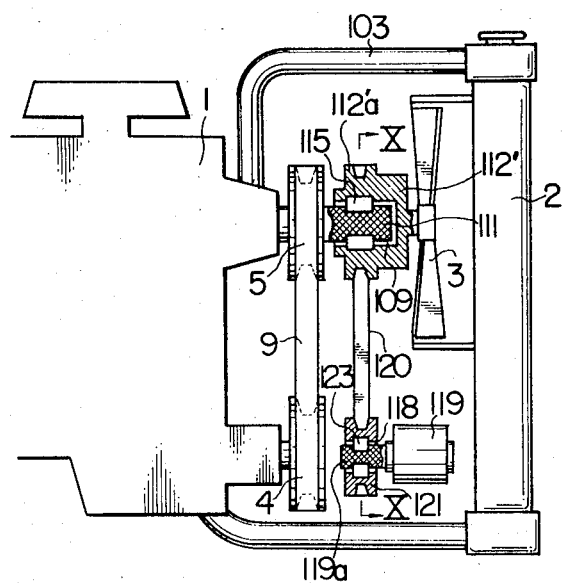
FIG. 9 is a fragmentary sectional view showing a sixth embodiment of the present invention.
Figure 10:
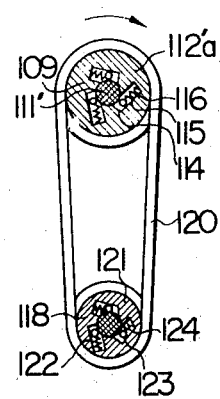
FIG. 10 is a sectional view taken along the oine X—X of FIG. 9.

The sixth embodiment of this invention will now be described with reference to FIGS. 9 and 10. The principal part of this embodiment is identical with that of the fifth embodiment excepting the locations of the first and second one-way clutches as will be explained hereinafter with reference to FIGS. 9 and 10. The first one-way clutch 109 performs the same function as in the fifth embodiment and it is provided between the driving pulley shaft 111 of the fan pulley 5 and a rotary shaft 112' of the cooling fan 3 having a cooling fan pulley 112' a formed integral therewith. On the other hand, the second one-way clutch 118 which performs the same function as in the fifth embodiment, is provided between the motor shaft 119a of the motor 119 and the motor pulley 121 mounted on the motor shaft 119a. In other words, the first one-way clutch 109 transmits the driving power in only one direction from the fan pulley 5 to the cooling fan 3, while the second one-way clutch 118 transmits the driving power in only one direction from the motor pulley 121 to the cooling fan 3.

With the construction described above, the operation of this sixth embodiment is as follows. When the motor 119 is not operating, the power is transmitted from the crankshaft pulley 4 of the engine 1 to the cooling fan 3 through the belt 9, the fan pulley 5 and the first one-way clutch 109 and thus the cooling fan 3 is driven. On the other hand, when, during idling for example, the temperature of the engine cooling water rises up to a predetermined temperature so that the thermostat switch 125 of FIG. 8 is closed, the motor 119 is energized to start operating. Consequently, the cooling fan 3 is driven by the driven by the driving power transmitted thereto through the motor pulley 121 of the motor 119, the second one-way clutch 118 mounted in the motor pulley 121, the belt 120, the fan pulley 112'a of the cooling fan 3 and the rotary shaft 112' of the cooling fan 3. In this case, the pulley ratio between the motor pulley 121 and the cooling fan pulley 112'a is preselected 1 : 2 and the number of revolutions of the motor 119 is preset so that it is operated at a higher speed of for example 3,000 rpm to increase the cooling capacity of the radiator 2. The rotational movement by the motor 119 is not transmitted to the fan pulley 5 by the action of the first one-way clutch 109.

We claim:

1. In a driving system for an automobile engine cooling fan comprising a radiator, and a cooling fan driven by an engine to draw cooling air through the radiator, the improvement comprising a first one-way clutch provided between said cooling fan and said engine to allow the transmission of driving power in only one direction from said engine to said cooling fan, a motor coupled to drive said cooling fan, a motor control means for controlling a supply of electric power to said motor.

2. A driving system according to claim 1, wherein said motor is mounted on the same shaft on which said cooling fan is mounted.

3. A driving system according to claim 1, wherein said motor control means detects the number of revolutions of said engine, whereby said motor is operated when said detected number of revolutions is lower than a predetermined value.

4. A driving system according to claim 1, wherein said motor control means detects the temperature of said engine, whereby said motor is operated when said detected temperature is higher than a predetermined value.

5. A driving system according to claim 1, wherein said motor comprises a printed motor.

6. A driving system according to claim 1 further comprising a second one-way clutch provided between said cooling fan and said motor to allow the transmission of driving power in only one direction from said motor to said cooling fan.

7. A driving system according to claim 6, wherein said second one-way clutch is mounted on said first one-way clutch.

8. A driving system according to claim 6, wherein said second one-way clutch is mounted on the driving shaft of said motor.

* * * * *